Nov. 26, 1929.  G. M. HARRY ET AL  1,736,913
BRAKE AND CLUTCH BAND AND METHOD OF MAKING SAME
Filed Sept. 8, 1927
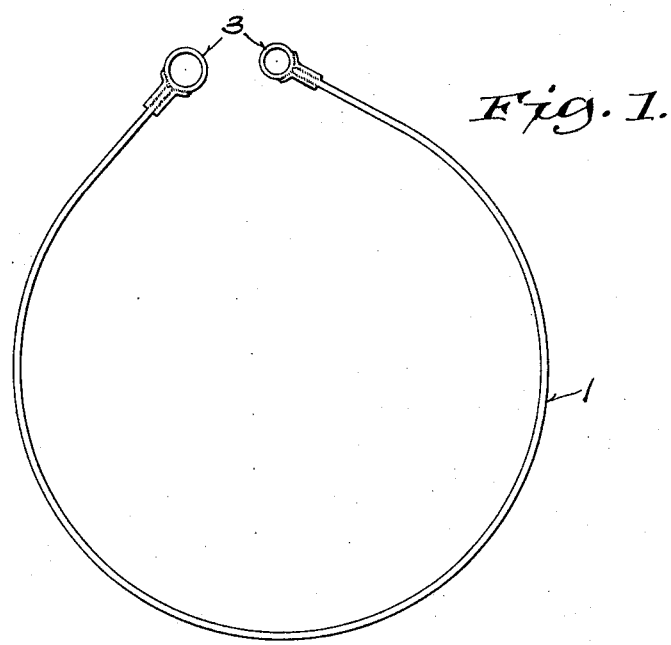
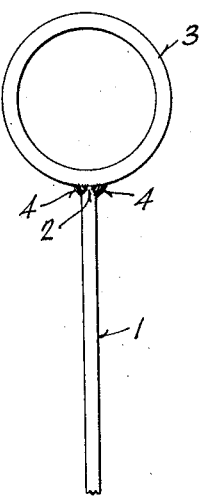
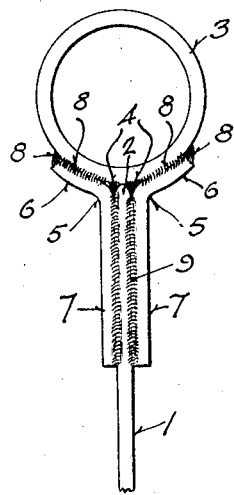
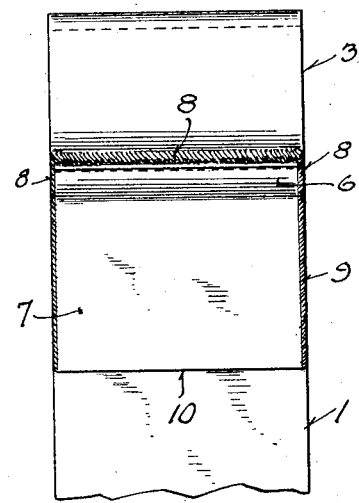
INVENTOR.
GEOFFREY M. HARRY
AND CHARLES STERNBERGER
BY
ATTORNEYS.

Patented Nov. 26, 1929

1,736,913

UNITED STATES PATENT OFFICE

GEOFFREY M. HARRY, OF MILWAUKEE, AND CHARLES STERNBERGER, OF WEST ALLIS, WISCONSIN, ASSIGNORS TO HARNISCHFEGER CORPORATION, OF MILWAUKEE, WISCONSIN, A CORPORATION OF WISCONSIN

BRAKE AND CLUTCH BANDS AND METHOD OF MAKING SAME

Application filed September 8, 1927. Serial No. 218,134.

This invention relates to an improvement in clutch and brake band construction for use in controlling the drums of excavating machinery, although also adapted for advantageous use in various other similar or diverse applications.

One object of the present invention resides in the provision of a band construction of the character wherein the connections provided at the ends of the band are permanently united with the band proper by welding in such a novel and effective manner as to retain unimpaired the original strength and flexibility of the band and yet provide a strong, rugged and durable connection.

Another object of the invention is to provide a band consisting of this character wherein the connections are in the form of sleeves so organized with the band as to be adapted to the small clearances available and otherwise especially designed for efficient coaction with the operating mechanism.

A still further object is to provide a novel method of making bands of this character. In the present instance this method consists in chamfering the ends of the band, butt-welding connecting sleeves to said ends, and edge welding reinforcing and attaching strips to the sleeves and to the edges only of the end portion of the band.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a side elevation showing a band constructed in accordance with the present invention.

Figure 2 is a fragmentary view and elevation showing the first step in the assembly of a connection or sleeve with an end of the band.

Figure 3 is a view similar to Figure 2 showing the final step in the assembly; and Figure 4 is a fragmentary view in top plan of one end of a band constructed in accordance with the present invention.

Referring to the drawings, the numeral 1 designates the band, which may be a brake band or clutch band. Each end of the band is chamfered as at 2. To these chamfered ends the connections for the operating mechanism are secured and in the present embodiment of the invention, these connections are shown as consisting of sleeves or small pieces of steel tubing arranged transversally to the ends of the bands. As illustrated in Figure 2, these sleeves which are designated at 3 are butt-welded, as indicated at 4, to the chamfered ends. Attaching and reinforcing strips 5 are then engaged with the sleeve and band, as shown in Figures 1, 3 and 4, these attaching and reinforcing strips having curved portions 6, snugly engaging portions of the tubes and also having straight and flat portions 7 snugly engaging the opposite faces of the end portions of the band. These reinforcing and attaching strips have their curved portions 6 edge-welded as at 8, to the sleeves 3 and also have their edges welded as at 9 to the edges only of the end portions of the band 1. The edges 10 of these strips 5, which extend across the band 1, are not welded. This is important as with the arc welding (arc welding is the preferred though not essential method of welding used throughout) a permanent union and connection is provided between the sleeves 3 and the band 1 without impairing the original strength, flexibility or resiliency of the band.

By organizing the connections of the sleeves 3 with the band 1 in the manner described, it becomes unnecessary to rivet the connections to the band or to use other fastening devices, and, further a connection possessing maximum strength and durability is had. Moreover, these connections are well adapted to the small clearances or crowded quarters in which they must operate. Finally, the symmetrical disposition of the sleeves at the ends of the band provides for transmission of the contracting force along the most effective lines and thus provides for most efficient action of the operating mechanism permitting the operator to forcibly and effectively manipulate the brake with ease and certainty.

The invention claimed is:

1. The hereindescribed method of making brake bands which consists in chamfering the ends of the band, butt-welding connecting sleeves to said ends and welding edges of attaching and reinforcing elements to the band and sleeves.

2. The hereindescribed method of making brake bands which consists in butt-welding a connecting element to an end of the band, welding an edge of an attaching and reinforcing element to the connecting element and welding side edges of the reenforcing element to the band.

3. The method of making brake bands which consists in securing a sleeve to an end of a band, bringing a reenforcing element into engagement with a portion of the sleeve and the side of the band, welding the reenforcing element to the sleeve, and welding side edges of the reenforcing element to the band.

4. A device of the character described comprising a band having chamfered ends, sleeves associated with said ends, butt welds for securing the sleeves to said ends, reenforcing and attaching strips having edges associated with the sleeves and having side edges adjacent to the edges of the end portion of the band, welds for securing said edges of the attaching strip to said sleeves and welds securing said side edges to the edges of said end portion.

5. A device of the class described comprising a band, a sleeve secured to the end of the band, and a reenforcing and attaching strip having curved portions snugly engaging the sleeve and flat portions engaging opposite faces at the end of the band, the edges of the strips being secured to the sleeve and to the edges only of the band.

6. A device of the class described comprising a band, a sleeve, a weld for securing said sleeve to said band, a reinforcing strip having a curved portion snugly engaging said sleeve, and a flat portion engaging an end of said band, a weld for securing said reinforcing strip to said sleeve, and a weld for securing said reinforcing strip to said band.

7. A device of the class described comprising a band, a sleeve, a pair of metal strips associated with one end of said band and each having a curved portion snugly engaging said sleeve and a flat portion engaging the end of said band, welds for securing the curved portions of said strips to said sleeve, and welds for securing the flat portions of said strips to said band whereby the sleeve is permanently united to said band without impairing the flexibility and resiliency of said band.

In witness whereof, we hereto affix our signatures.

GEOFFREY M. HARRY.
CHAS. STERNBERGER.